(12) United States Patent
Ju et al.

(10) Patent No.: US 11,556,004 B2
(45) Date of Patent: Jan. 17, 2023

(54) METHOD AND APPARATUS FOR ESTIMATING POSITION OF IMAGE DISPLAY DEVICE

(71) Applicant: Samsung Electronics Co., Ltd., Suwon-si (KR)

(72) Inventors: Hojin Ju, Suwon-si (KR); Donghoon Sagong, Suwon-si (KR); Jaehwan Pi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 17/324,146

(22) Filed: May 19, 2021

(65) Prior Publication Data

US 2022/0187598 A1 Jun. 16, 2022

(30) Foreign Application Priority Data

Dec. 11, 2020 (KR) ........................ 10-2020-0173495

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0138* (2013.01); *G02B 2027/0178* (2013.01)

(58) Field of Classification Search
CPC ............ G02B 27/0093; G02B 27/0172; G02B 2027/0138; G02B 2027/0178
See application file for complete search history.

(56) References Cited

U.S. PATENT DOCUMENTS

| 5,742,264 | A  | * | 4/1998  | Inagaki ................. G09G 5/397 348/E5.145 |
| 8,947,323 | B1 | * | 2/2015  | Raffle ................ G02B 27/0093 345/157 |
| 10,055,887 | B1 | * | 8/2018  | Gil ....................... G02B 27/017 |
| 10,268,268 | B1 | * | 4/2019  | Trail .................... H04N 5/2256 |
| 10,629,003 | B2 |   | 4/2020  | Miller et al. |
| 2010/0039353 | A1 | * | 2/2010 | Cernasov ............. G02B 27/017 345/589 |
| 2014/0306866 | A1 |   | 10/2014 | Miller et al. |
| 2015/0213702 | A1 | * | 7/2015 | Kimmel ................ G06V 20/52 382/103 |

(Continued)

FOREIGN PATENT DOCUMENTS

KR 10-2019-0048565 A 5/2019
KR 10-2049506 B1 11/2019

(Continued)

OTHER PUBLICATIONS

Fang, Wei, et al. "Real-Time Motion Tracking for Mobile Augmented/Virtual Reality Using Adaptive Visual-Inertial Fusion," *Sensors*, 17, 5, 2017 (pp. 1-22).

*Primary Examiner* — Dmitriy Bolotin
(74) *Attorney, Agent, or Firm* — NSIP Law (57) ABSTRACT

A method of estimating a position of an image display device, the method including determining position information of a neck of a user based on position information of an image display device worn by the user, filtering the position information of the neck, and estimating a position of the image display device based on the filtered position information of the neck.

26 Claims, 3 Drawing Sheets

(56) References Cited

U.S. PATENT DOCUMENTS

| | | | |
|---|---|---|---|
| 2015/0257682 A1* | 9/2015 | Hansen | A61B 5/7475 |
| | | | 382/103 |
| 2016/0035139 A1 | 2/2016 | Fuchs et al. | |
| 2019/0026874 A1 | 1/2019 | Jin et al. | |
| 2019/0041978 A1 | 2/2019 | Loh et al. | |
| 2019/0094955 A1 | 3/2019 | Zuber et al. | |
| 2020/0068187 A1 | 2/2020 | Linde et al. | |
| 2021/0149190 A1* | 5/2021 | Johnson | H04N 13/344 |

FOREIGN PATENT DOCUMENTS

| | | |
|---|---|---|
| WO | WO 2019/204638 A1 | 10/2019 |
| WO | WO 2019/228633 A1 | 12/2019 |
| WO | WO 2020/023399 A1 | 1/2020 |

* cited by examiner

METHOD AND APPARATUS FOR ESTIMATING POSITION OF IMAGE DISPLAY DEVICE

CROSS-REFERENCE TO RELATED APPLICATIONS

This application claims the benefit under 35 USC § 119(a) of Korean Patent Application No. 10-2020-0173495 filed on Dec. 11, 2020, in the Korean Intellectual Property Office, the entire disclosure of which is incorporated herein by reference for all purposes.

BACKGROUND

1. Field

The following description relates to a method and apparatus for estimating a position of an image display device.

2. Description of Related Art

Some virtual reality (VR) devices or augmented reality (AR) devices are mounted on the head of a user and require the position of the user for operation. Small jitter may occur in estimating the position of the user, which may disturb the immersive experience of the user. To remove jitter, filtering may be performed by using a low-pass filter. However, latency may occur when a low-pass filter is used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of estimating a position of an image display device, the method including determining position information of a neck of a user based on position information of an image display device worn by the user, filtering the position information of the neck, and estimating a position of the image display device based on the filtered position information of the neck.

The filtering may include filtering position change information in the position information of the neck, except for pose change information generated by rotation about the neck.

The filtering may include filtering position change information in the position information of the neck using a low-pass filter.

The filtering of the position change information may include comparing the position change information to a reference value, and filtering the position change information by setting a cut-off frequency of the low-pass filter based on a result of the comparing.

The filtering of the position change information may include filtering the position change information by setting the cut-off frequency of the low-pass filter to be higher than a threshold, in response to the position change information being greater than the reference value, and filtering the position change information by setting the cut-off frequency of the low-pass filter to be lower than the threshold, in response to the position change information being lesser than or equal to the reference value.

The estimating may include estimating the position of the image display device by applying relative position information between the image display device and the neck to the filtered position information of the neck.

The determining may include calculating the position information of the image display device, and determining the position information of the neck by applying a pose change of the neck sensed by sensors to the position information of the image display device.

The calculating of the position information of the image display device may include calculating the position information of the image display device using simultaneous localization and mapping (SLAM).

The sensors may include any two or any combination of an inertial measurement unit (IMU) sensor, a camera sensor, and a depth sensor.

The method may include rendering an image based on the estimated position, and providing the rendered image to the user.

The image display device may include at least one of a wearable device including a smart glass, a head-mounted device (HMD), a head-mounted device (HMD) including an augmented reality (AR) device, a head-mounted device (HMD) including a virtual reality (VR) device, and a head-mounted device (HMD) including a mixed reality (MR) device.

In another general aspect, there is provided an image display device, including a processor configured to determine position information of a neck of a user based on position information of the image display device worn by the user, filter the position information of the neck, and estimate a position of the image display device based on the filtered position information of the neck.

The processor may be configured to filter position change information in the position information of the neck, except for pose change information generated by rotation about the neck.

The processor may be configured to filter position change information in the position information of the neck using a low-pass filter.

The processor may be configured to compare the position change information to a reference value, and to filter the position change information by setting a cut-off frequency of the low-pass filter based on a result of the comparing.

The processor may be configured to filter the position change information by setting the cut-off frequency of the low-pass filter to be higher than a threshold, in response to the position change information being greater than the reference value, and filter the position change information by setting the cut-off frequency of the low-pass filter to be lower than the threshold, in response to the position change information being lesser than or equal to the reference value.

The processor may be configured to estimate the position of the image display device by applying relative position information between the image display device and the neck to the filtered position information of the neck.

The image display device may include sensors configured to sense a pose change of the neck, wherein the processor may be configured to calculate the position information of the image display device, and to determine the position information of the neck by applying the pose change of the neck to the position information of the image display device.

The image display device may include a display configured to display an image rendered based on the estimated position of the image display device.

In another general aspect, there is provided an image display device, including a processor configured to determine position information of a neck of a user based on position information of the image display device worn by the user, filter position change information in the position information of the neck by setting a cut-off frequency of a low-pass filter to be higher than a threshold, in response to the position change information being greater than a reference value, filter the position change information by setting the cut-off frequency of the low-pass filter to be lower than the threshold, in response to the position change information being lesser than or equal to the reference value, and estimate a position of the image display device based on the filtered position information of the neck, and a display configured to display an image rendered based on the estimated position of the image display device.

The method may include sensors configured to sense a pose change of the neck, and the processor may be configured to determine the position information of the neck based on applying the pose change of the neck to the position information of the image display device.

The pose change may include a position change of the neck between a first frame and a second frame captured by the sensors.

The position information of an image display device may include position at which a camera is disposed in the image display device.

In another general aspect, there is provided a method of estimating a position of an image display device, the method including determining position information of a part of a body of a user based on position information of an image display device worn by the user, filtering the position information of the part of the body using an adaptive low pass filter, and estimating a position of the image display device based on applying relational position information between the image display device and the part of the body to the filtered position information of the part of the body.

The part of the body may be a neck of the user.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as A, B, C, (a), (b), (c), "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," "has," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

Hereinafter, examples will be described in detail with reference to the accompanying drawings. When describing the examples with reference to the accompanying drawings, like reference numerals refer to like components and a repeated description related thereto will be omitted.

Figure 1:
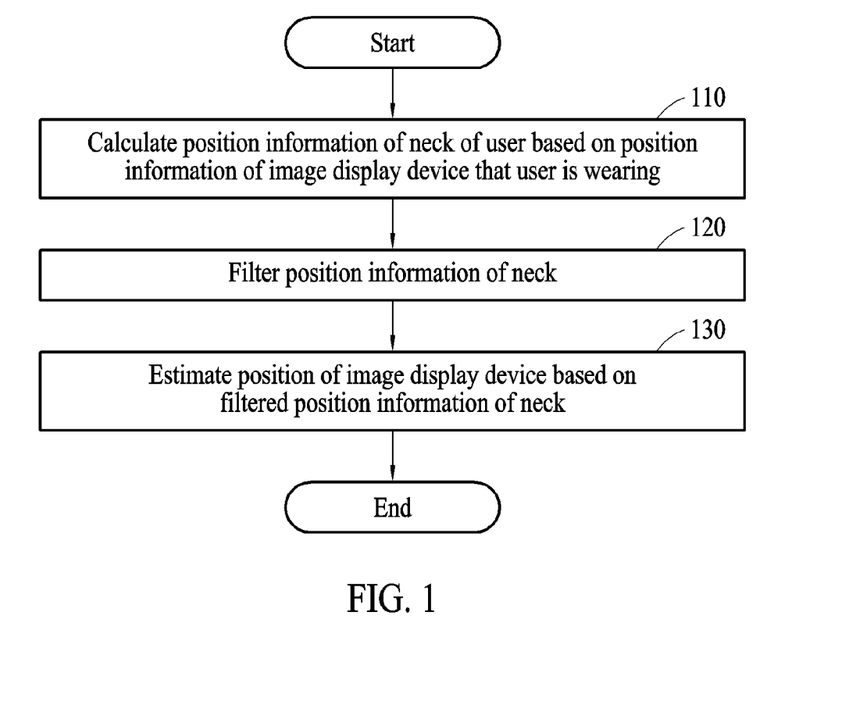
FIG. 1 illustrates an example of a method of estimating a position of an image display device.
Figure 2:
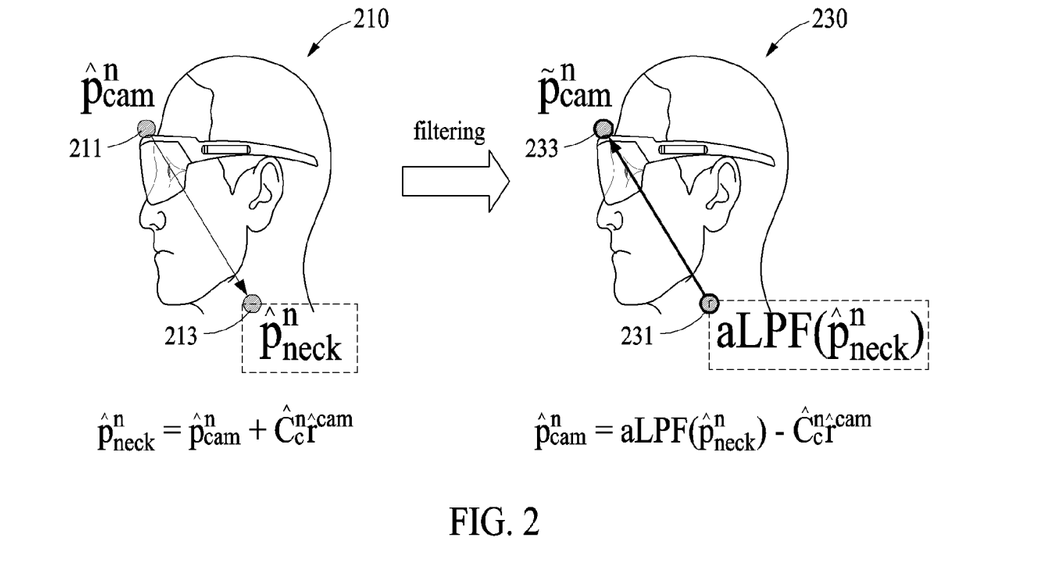
FIG. 2 illustrates an example of estimating a position of an image display device.

FIG. 1 illustrates an example of a method of estimating a position of an image display device, and FIG. 2 illustrates an example of estimating a position of an image display device. The operations in FIG. 1 may be performed in the sequence and manner as shown, although the order of some operations may be changed or some of the operations omitted without departing from the spirit and scope of the illustrative examples described. Many of the operations shown in FIG.

1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions. FIG. 1 illustrates an example of estimating a position of an image display device through operations 110 to 130 is illustrated using the image display device illustrated in FIG. 2.

In FIG. 2, 210 illustrates a position of the image display device before filtering is performed and 230 illustrates a position of the image display device after filtering is performed.

In operation 110, the image display device calculates position information of a portion of a body of a user, such as the neck or a shoulder of a user based on position information of the image display device worn by the user. The position information of the image display device is information indicating the position of the image display device, and may correspond to the position of a predetermined point of the image display device. In an example, the position of a predetermined point of the image display device may be the position at which a camera is installed. The position information of the neck may correspond to information indicating the position of the neck. The position information of the neck may be expressed in, for example, 6 degrees of freedom. However, examples are not limited thereto. The position information of the neck may also be expressed in various forms other than 6 degrees of freedom.

In operation 110, the image display device may calculate the position information of the image display device that the user is wearing. The image display device may calculate the position information of the image display device using, for example, simultaneous localization and mapping (SLAM). The image display device may calculate the position information of the neck by applying a pose change of the neck sensed by sensors (for example, sensors 510 of FIG. 5) to the position information of the image display device. As will be described in more detail below, the pose change of the neck may correspond to, for example, to a position change of the neck between a first frame and a second frame. The pose change of the neck may be obtained based on a relative position vector $\hat{r}^{cam}$ between the image display device and the neck and a pose term $\hat{C}_c^n$.

The image display device may include the sensors for calculating the position information of the neck of the user, and sense the pose change of the neck through the sensors. The sensors may include any two or any combination of an inertial measurement unit (IMU) sensor, a camera sensor, and a depth sensor, but are not necessarily limited thereto. The image display device may include various other types of sensors capable of calculating the pose change of the neck of the user who is wearing the image display device. The image display device may be a device capable of displaying a virtual reality (VR) image, an augmented reality (AR) image, and a mixed reality (MR) image to the user. For an example of the configuration of the image display device, reference may be made to an image display device 500 of FIG. 5 below.

The image display device may include, for example, a wearable device including a smart glass, and a head-mounted device (HMD) including an AR device, a VR device, and an MR device, but are not necessarily limited thereto. The image display device may include, for example, any and all devices equipped with a camera, an IMU sensor, and a depth measurement sensor to estimate the position of the user. The image display device may also be configured in various forms such as an eyeglass, a helmet, a hat, a bandana, a headband, and an earphone.

In operation 110, the image display device may calculate position information $\hat{p}_{neck}^n$ of the neck of the user, which is indicated as 213 in FIG. 2, based on position information $\hat{p}_{cam}^n$ 211 of the image display device that the user is wearing (for example, the position of the camera), as shown in 210. The image display device may calculate the position information $\hat{p}_{neck}^n$ 213 of the neck of the user, as expressed by Equation 1 below. In this case, the position information $\hat{p}_{cam}^n$ 211 of the image display device may be calculated through SLAM.

$$\hat{p}_{neck}^n = \hat{p}_{cam}^n + \hat{C}_c^n \hat{r}^{cam} \qquad \text{[Equation 1]}$$

Here, $\hat{C}_c^n$ may be a parameter for converting a camera frame according to the camera coordinate system into a navigation frame according to the world coordinate system. $\hat{C}_c^n$ may be a term indicating the pose change of the neck with respect to the image display device. $\hat{C}_c^n$ may be, for example, a direction cosine matrix of the image display device in the navigation frame.

In addition, $\hat{r}^{cam}$ may be a position vector indicating a relative position or correlation between the image display device and the neck of the user determined by a pose change of the user. $\hat{r}^{cam}$ may be, for example, a vector in the direction of the neck in the image display device.

$\hat{r}^{cam}$ may be set to a fixed value that approximates an average value for the distance between a point of the image display device that the user is wearing, for example, a point where the camera is positioned and the neck of the user. In an examples, the image display device may set $\hat{r}^{cam}$ differently for each user based on the actual distance between the image display device and the neck of the user.

In operation 120, the image display device filters the position information of the neck. The image display device may filter position change information, except for pose change information generated by rotation about the neck, in the calculated position information of the neck. Hereinafter, the "pose change information" may be construed as information indicating a position change generated by rotation about the neck of the user. The pose change information may include, for example, a pitch, a yaw, and a roll generated by rotation about the neck of the user, but is not necessarily limited thereto. In an example, the image display device may filter the position change information in the position information of the neck using a low-pass filter. The low-pass filter may be, for example, an adaptive low-pass filter (aLPF). The position change information filtered by the aLPF may be denoted by aLPF($\hat{p}_{neck}^n$), which is indicated as 231 in FIG. 2.

For example, latency may occur in the process of estimating the position of the image display device and rendering an image. In order to prevent latency, the rendering may be performed at the predicted position of the image display device, and warping may be performed using values measured by devices, such as the IMU sensor. When the position of the image display device is estimated using only the IMU sensor for a short time during warping, jitter may occur.

The image display device may perform low pass filtering at the position of the neck, rather than at the position of the image display device, to reduce latency occurring when removing jitter that disturbs the immersion of the user when a VR image and/or an AR image is provided. The image display device may filter a portion of the position information of the neck, i.e., position change information in the position information of the neck, except for pose change information generated by rotation about the neck, thereby removing jitter and minimizing filtering such that the user may not feel the latency.

In operation 120, the image display device may compare the position change information to a reference value, and filter the position change information by setting a cut-off frequency of the low-pass filter based on a result of the comparison. An example of filtering the position change information by the image display device will be described in more detail with reference to FIG. 3 below.

In operation 130, the image display device estimates the position of the image display device based on the filtered position information of the neck. The image display device may estimate the position of the image display device by applying relative position information between the image display device and the neck to the filtered position information of the neck.

As shown in 230, the image display device may estimate the position $\tilde{p}_{cam}^n$ 233 of the image display device based on the filtered position information $aLPF(\hat{p}_{neck}^n)$ 231 of the neck, which is expressed by Equation 2, for example.

$$\tilde{p}_{cam}^n = aLPF(\hat{p}_{neck}^n) - \hat{C}_c^n \hat{r}^{cam} \qquad \text{Equation 2}$$

Here, $\tilde{p}_{cam}^n$ may be the estimated position of the image display device. When $\tilde{p}_{cam}^n$ is used as the estimated position, filtering is not performed on the pose change information corresponding to a position change generated by rotation about the neck. Thus, the occurrence of latency may be reduced.

For example, when rotation is calculated through gyroscope(s) in the inertial measurement unit, a position change according to the rotation may cause very small jitter. Thus, filtering may not be performed on the pose change information generated by rotation.

For example, it may be assumed a SLAM system uses a camera that operates at 30 Hz. If the SLAM system estimates a gyro bias to be 0.1°/s or less, the parameter $\hat{C}_c^n$ may cause jitter of 0.0033° or less for 0.033 s. Also, an inexpensive IMU sensor has random walk noise of $0.014°/s/\sqrt{Hz}$ and thus, may cause jitter of 0.0024°.

Therefore, jitter of about 0.0057° may be caused, and if $\hat{r}^{cam}$ is a vector having a length of about 0.2 m, jitter of about 0.02 mm may be caused. In other words, the jitter caused when the position of the neck is calculated using $\hat{C}_c^n \hat{r}^{cam}$ may be about 0.02 mm. Humans may perceive jitter of much less than 0.2 mm. By not filtering the pose change information generated by rotation, the occurrence of latency may be reduced.

The image display device may render an image based on the estimated position and provide the rendered image to the user, thereby improving the immersion of the user in the VR image and/or the AR image.

Figure 3:
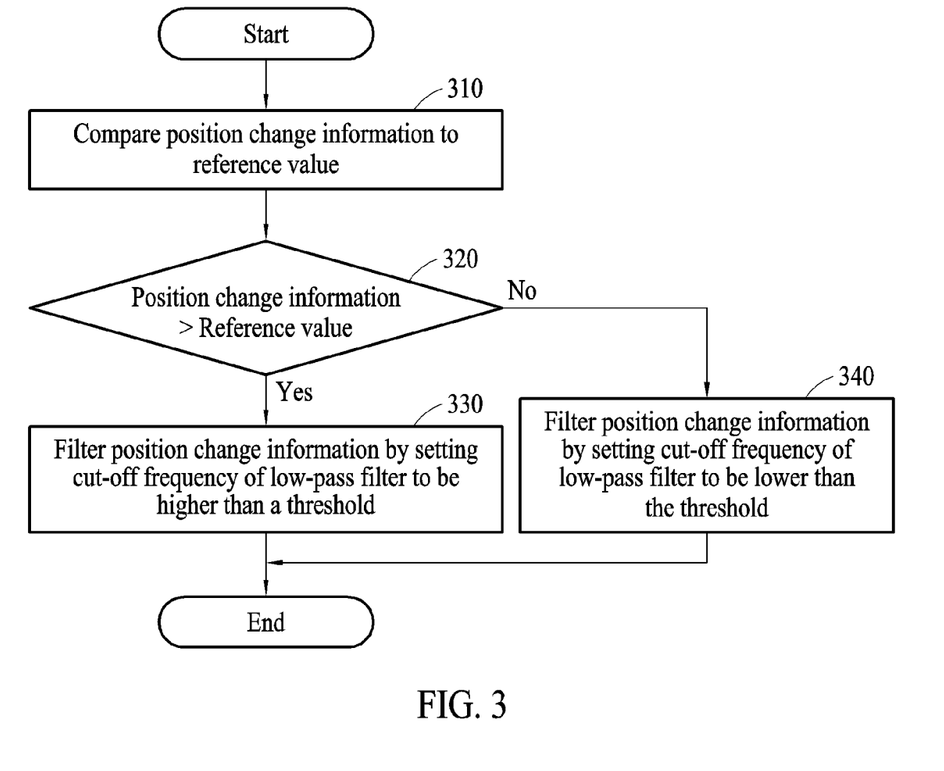
FIG. 3 illustrates an example of filtering position change information.

FIG. 3 illustrates an example of filtering position change information. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, the image display device may compare the position change information calculated in operation 120 to a reference value.

In operation 320, the image display device may determine whether the position change information is greater than the reference value.

When it is determined that the position change information is greater than the reference value, in operation 330, the image display device may filter the position change information by setting the cut-off frequency of the low-pass filter to be higher than a threshold. In an example, the position change information being greater than the reference value indicates that the position change information corresponds to a dynamic change in which a large movement is present. Thus, the image display device may increase the filtering strength by increasing the cut-off frequency.

In another example, when it is determined that the position change information is less than or equal to the reference value, in operation 340, the image display device may filter the position change information by setting the cut-off frequency of the low-pass filter to be lower than the threshold. In an example, the position change information being less than or equal to the reference value indicates that the position change information corresponds to a static change in which no movement or a diminutive movement is present. Thus, the image display device may decrease the filtering strength by lowering the cut-off frequency.

Figure 4:
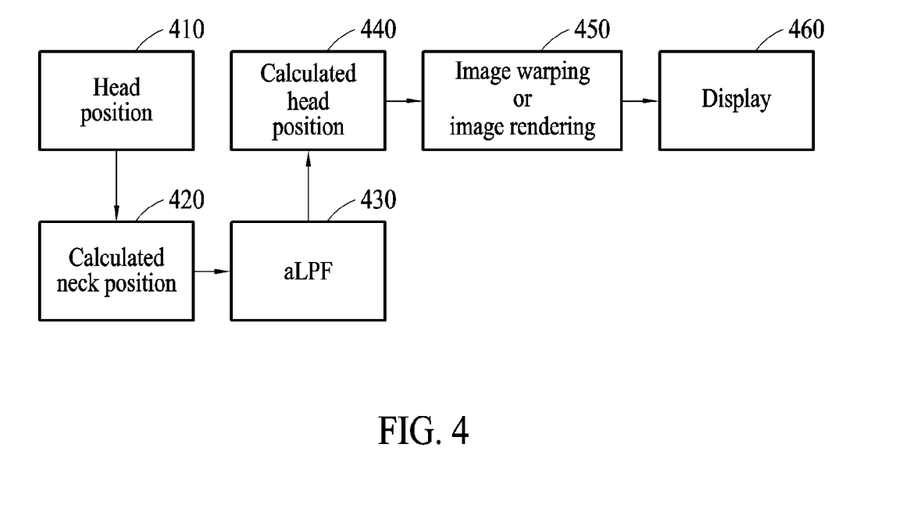
FIG. 4 illustrates an example of a method of estimating a position of an image display device.

FIG. 4 illustrates an example of a method of estimating a position of an image display device by the image display device through operations 410 to 460. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, the image display device may calculate a head position of the user who is wearing the image display device.

In operation 420, the image display device may calculate the position information of the neck based on the calculated head position.

In operation 430, the image display device may filter the calculated position information of the neck using an adaptive low-pass filter (aLPF).

In operation 440, the image display device may newly estimate a head position of the user who is wearing the image display device based on the filtered position information of the neck.

In operation 450, the image display device may render and/or warp an image based on the newly estimated head position. In this case, the image may be, for example, any one of a VR image, an AR image, and/or an MR image.

In operation 460, the image display device may display the rendered and/or warped image.

Figure 5:
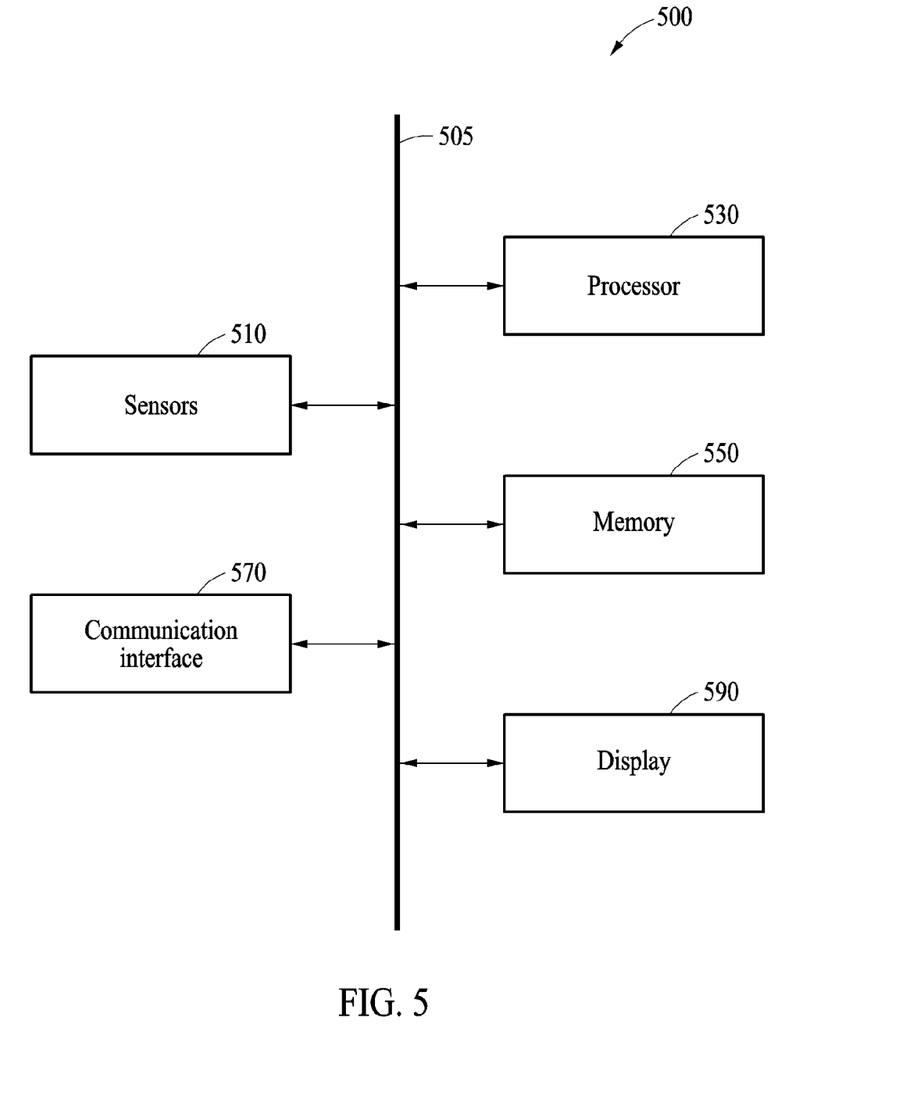
FIG. 5 illustrates an example of an image display device.

FIG. 5 illustrates an example of an image display device. Referring to FIG. 5, an image display device 500 includes sensors 510, a processor 530, a memory 550, a communication interface 570, and a display 590. The sensors 510, the processor 530, the memory 550, the communication interface 570, and the display 590 may be connected to each other through a communication bus 505.

The sensors 510 calculate position information of the neck of a user who is wearing an image display device. The sensors 510 may sense the position information of the neck with 6 degrees of freedom with respect to the head including the neck of the user. The sensors 510 may include, for example, an inertial measurement unit (IMU) sensor, a camera sensor, and a depth sensor. However, examples are not limited thereto, and other types of sensors may be used without deviating from the spirit or scope of the illustrative examples described herein.

The processor 530 calculates position change information generated in response to a translation about the neck and rotation conversion information generated in response to a rotation about the neck, based on the position information of the neck sensed by the sensors 510. The processor 530 filters the position change information. The processor 530 estimates the position of the image display device based on the rotation conversion information and the filtered position change information. However, the operation of the processor 530 is not limited thereto. In another example, the processor 530 may perform the above operation together with at least one of the operations described above with reference to FIGS. 1 to 4.

The processor 530 may be a neural network or image display device implemented by hardware including a circuit having a physical structure to perform desired operations. For example, the desired operations may include instructions or codes included in a program. For example, the hardware-implemented image display device may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 530 is given below.

The processor 530 may execute a program and control the image display device 500. Program codes to be executed by the processor 530 may be stored in the memory 550.

The memory 550 may store information related to a position change of the neck sensed by the sensors 510. The memory 550 may store position change information and rotation conversion information calculated by the processor 530. Further, the memory 550 may store the position of the image display device 500 calculated by the processor 530.

The memory 550 may store a variety of information generated by the processor 530 described above. In addition, the memory 550 may store a variety of data and programs. The memory 550 may include a volatile memory or a non-volatile memory. In an example, the memory 550 may include a large-capacity storage medium such as a hard disk to store a variety of data.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 550 is given below.

The communication interface 570 may transmit the position of the image display device calculated by the processor 530 to the outside of the image display device.

The display 590 may display an image rendered by the processor 530 based on the position estimated by the processor 530.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the method of estimating a position of an image display device. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of estimating a position of an image display device, the method comprising:
   determining position information of a neck of a user based on position information of an image display device worn by the user;
   filtering the position information of the neck; and
   estimating a position of the image display device based on the filtered position information of the neck.

2. The method of claim 1, wherein the filtering comprises filtering position change information in the position information of the neck, except for pose change information generated by rotation about the neck.

3. The method of claim 1, wherein the filtering comprises filtering position change information in the position information of the neck using a low-pass filter.

4. The method of claim 3, wherein the filtering of the position change information comprises:
   comparing the position change information to a reference value; and filtering the position change information by setting a cut-off frequency of the low-pass filter based on a result of the comparing.

5. The method of claim 4, wherein the filtering of the position change information comprises:
filtering the position change information by setting the cut-off frequency of the low-pass filter to be higher than a threshold, in response to the position change information being greater than the reference value; and
filtering the position change information by setting the cut-off frequency of the low-pass filter to be lower than the threshold, in response to the position change information being lesser than or equal to the reference value.

6. The method of claim 1, wherein the estimating comprises estimating the position of the image display device by applying relative position information between the image display device and the neck to the filtered position information of the neck.

7. The method of claim 1, wherein the determining comprises:
calculating the position information of the image display device; and
determining the position information of the neck by applying a pose change of the neck sensed by sensors to the position information of the image display device.

8. The method of claim 7, wherein the calculating of the position information of the image display device comprises calculating the position information of the image display device using simultaneous localization and mapping (SLAM).

9. The method of claim 7, wherein the sensors comprise any two or any combination of an inertial measurement unit (IMU) sensor, a camera sensor, and a depth sensor.

10. The method of claim 1, further comprising:
rendering an image based on the estimated position; and
providing the rendered image to the user.

11. The method of claim 1, wherein the image display device comprises at least one of:
a wearable device including a smart glass;
a head-mounted device (HMD);
a head-mounted device (HMD) including an augmented reality (AR) device;
a head-mounted device (HMD) including a virtual reality (VR) device; and
a head-mounted device (HMD) including a mixed reality (MR) device.

12. A non-transitory computer-readable storage medium storing instructions that, when executed by a processor, cause the processor to perform the method of claim 1.

13. An image display device, comprising:
a processor configured to
determine position information of a neck of a user based on position information of the image display device worn by the user,
filter the position information of the neck, and
estimate a position of the image display device based on the filtered position information of the neck.

14. The image display device of claim 13, wherein the processor is further configured to filter position change information in the position information of the neck, except for pose change information generated by rotation about the neck.

15. The image display device of claim 13, wherein the processor is further configured to filter position change information in the position information of the neck using a low-pass filter.

16. The image display device of claim 15, wherein the processor is further configured to compare the position change information to a reference value, and to filter the position change information by setting a cut-off frequency of the low-pass filter based on a result of the comparing.

17. The image display device of claim 16, wherein the processor is further configured to:
filter the position change information by setting the cut-off frequency of the low-pass filter to be higher than a threshold, in response to the position change information being greater than the reference value, and
filter the position change information by setting the cut-off frequency of the low-pass filter to be lower than the threshold, in response to the position change information being lesser than or equal to the reference value.

18. The image display device of claim 13, wherein the processor is further configured to estimate the position of the image display device by applying relative position information between the image display device and the neck to the filtered position information of the neck.

19. The image display device of claim 13, further comprising:
sensors configured to sense a pose change of the neck,
wherein the processor is further configured to calculate the position information of the image display device, and to determine the position information of the neck by applying the pose change of the neck to the position information of the image display device.

20. The image display device of claim 13, further comprising:
a display configured to display an image rendered based on the estimated position of the image display device.

21. An image display device, comprising:
a processor configured to
determine position information of a neck of a user based on position information of the image display device worn by the user,
filter position change information in the position information of the neck by setting a cut-off frequency of a low-pass filter to be higher than a threshold, in response to the position change information being greater than a reference value,
filter the position change information by setting the cut-off frequency of the low-pass filter to be lower than the threshold, in response to the position change information being lesser than or equal to the reference value, and
estimate a position of the image display device based on the filtered position information of the neck; and
a display configured to display an image rendered based on the estimated position of the image display device.

22. The method of claim 21, further comprising:
sensors configured to sense a pose change of the neck; and
the processor is further configured to determine the position information of the neck based on applying the pose change of the neck to the position information of the image display device.

23. The method of claim 22, wherein the pose change comprises a position change of the neck between a first frame and a second frame captured by the sensors.

24. The method of claim 21, wherein the position information of an image display device comprises position at which a camera is disposed in the image display device.

25. A method of estimating a position of an image display device, the method comprising:

determining position information of a part of a body of a user based on position information of an image display device worn by the user;

filtering the position information of the part of the body using an adaptive low pass filter; and estimating a position of the image display device based on applying relational position information between the image display device and the part of the body to the filtered position information of the part of the body.

26. The method of claim 25, wherein the part of the body is a neck of the user.

\* \* \* \* \*